(12) United States Patent
Huang

(10) Patent No.: US 12,109,929 B2
(45) Date of Patent: Oct. 8, 2024

(54) HIGH-PRACTICABILITY CAR TRASH CAN

(71) Applicant: Shenzhen zhongdaxin Epoxy plate Co. Ltd., Shenzhen (CN)

(72) Inventor: Shengwen Huang, Shenzhen (CN)

(73) Assignee: Shenzhen zhongdaxin Epoxy plate Co. Ltd., Shenzhen (CN)

(*) Notice: Subject to any disclaimer, the term of this patent is extended or adjusted under 35 U.S.C. 154(b) by 0 days.

(21) Appl. No.: 18/430,684

(22) Filed: Feb. 2, 2024

(65) Prior Publication Data
US 2024/0166112 A1 May 23, 2024

(30) Foreign Application Priority Data
Jan. 15, 2024 (CN) .......................... 202410054856.0

(51) Int. Cl.
| | |
|---|---|
| *B65F 1/16* | (2006.01) |
| *B60N 3/08* | (2006.01) |
| *B65F 1/02* | (2006.01) |
| *B65F 1/14* | (2006.01) |

(52) U.S. Cl.
CPC .................. *B60N 3/08* (2013.01); *B65F 1/02* (2013.01); *B65F 1/141* (2013.01); *B65F 1/1646* (2013.01); *B65F 2001/1676* (2013.01); *B65F 2210/167* (2013.01); *B65F 2210/18* (2013.01)

(58) Field of Classification Search
CPC .......... B65F 1/02; B65F 1/141; B65F 1/1646; B65F 2001/1676; B65F 2210/167; B65F 2210/18; B60N 3/08

USPC ....... 220/495.06, 845, 908; 383/22; 224/928
See application file for complete search history.

(56) References Cited

U.S. PATENT DOCUMENTS

| | | | | |
|---|---|---|---|---|
| 1,938,452 | A | * 12/1933 | Griemeyer | ................ B65F 1/06 383/7 |
| 5,490,623 | A | * 2/1996 | McConnell | ............. B60R 7/043 224/539 |
| 2008/0237234 | A1 | 10/2008 | Yang et al. | |
| 2017/0144835 | A1* | 5/2017 | Butler | ..................... B65F 1/002 |
| 2019/0152695 | A1 | 5/2019 | Wegner et al. | |
| 2022/0161996 | A1* | 5/2022 | Wang | .................... B65F 1/1623 |
| 2023/0226964 | A1 | 7/2023 | Park | |

* cited by examiner

*Primary Examiner* — Elizabeth J Volz
(74) *Attorney, Agent, or Firm* — Hemisphere Law, PLLC; Zhigang Ma

(57) ABSTRACT

A high-practicability car trash can includes a trash can body, an anti-odor cover body, an anti-odor base, and a rotatable connection rod component. The anti-odor cover body is connected to an upper part of the trash can body in a matched manner. The trash can body is of a storable can body structure made of an elastic soft material. The anti-odor base is arranged between the trash can body and the anti-odor cover body. A lower part of the anti-odor base and the upper part of the trash can body are matched in appearance. An upper part of the anti-odor base and the anti-odor cover body are matched in shape. The rotatable connection rod component is configured to connect the anti-odor cover body to the anti-odor base. One end of the rotatable connection rod component is rotatably and movably connected to the anti-odor cover body.

10 Claims, 7 Drawing Sheets

HIGH-PRACTICABILITY CAR TRASH CAN

TECHNICAL FIELD

The present disclosure relates to the technical field of car trash can products, and in particular, to a high-practicability car trash can with a reasonable structural design, application convenience, and high sealing property.

BACKGROUND

With the continuous development of the society, there are more and more sedan cars. It is inevitable to produce garbage when people sit in sedan cars. Throwing garbage out of windows is unethical. Most car owners will choose to place a trash can in the cars. Moreover, a space in the car is closed. As most of containers for collecting waste food in the closed space are open containers, there are problems of odor and liquid leakage. In addition, there are problems of food waste and overflowing of residual liquid in the closed space, which can easily lead to inevitable moisture and mildewing, affecting the use of the car.

Based on this, various types of garbage bags with certain sealing effects and trash cans with certain sealing effects have emerged on the market. In practical applications, due to a small space inside the car, it is not possible to place a large-sized trash can. The car is generally in a closed state. If the sealing performance of the trash can is poor, strong odor will be given off, which will affect the riding experience. To solve the above problems, in the prior art, a plastic fiber made of cloth and an aluminum film, plastic, or a container stuck with a layer of self-adhesive aluminum foil or a rubber film is generally used to collect waste food or items. However, the items stored will still be affected by moisture and mold. Over time, the problems such as overflowing of residual liquid and odor inevitably occur. The space in the car will be inevitably moisturized and molded, which affects the use of the car. Car equipment will also be moisturized and molded, and even the equipment will be damaged. When waste food is removed from a non-waterproof container, liquid will leak, or the rubber film needs to be taken out for cleaning. Furthermore, it is hard to clean the container, and cleaning the container wastes time and labor. The product in the prior has a series of the above problems. This affects practical applications and popularizations of the product.

The utility model patent No. CN202021034163.9, entitled Car Trash Can, specifically discloses a car trash can, which includes an upper trash can body, a lower trash can body, and a trash can hook. The trash can hook is connected to the upper trash can body through a connecting rod; a strip-shaped groove is arranged on a back surface of the upper trash can body; a strip-shaped convex block is arranged at a top of the trash can hook; the strip-shaped convex block fixes the trash can hook in the strip-shaped groove of the upper trash can body; the upper trash can body and the lower trash can body are connected in a buckling manner; the lower trash can body is provided with a horizontal sieve; the horizontal sieve and the lower trash can body are of an integrated structure; a movable inner drum is arranged inside the lower trash can body; and the movable inner drum can be pulled out from one side of the lower trash can body. The present disclosure has a reasonable structural design, occupies a small space, and can solve the problem of garbage classification in the car trash can.

A product corresponding to the technical features disclosed in the above-mentioned patent has the problems of large size, low sealing performance, and the like. Based on this, further structural improvement needs to be made.

SUMMARY

Problems to be Solved in the Prior Art by the Present Disclosure are as Follows As a space in a car is narrow, a large-sized trash can cannot be placed. Furthermore, the car is generally in a closed state. If the sealing performance of the trash can is poor, strong odor will be given off, which will affect the riding experience. The product in the prior has the problems of poor storage, poor sealing performance, and the like.

Solutions of the Present Disclosure for Solving the Technical Problems are as Follows A high-practicability car trash can is provided, which includes a trash can body, an anti-odor cover body, an anti-odor base, a rotatable connection rod component, a container fixing ring, and a sling component. The anti-odor cover body is connected to an upper part of the trash can body in a matched manner. The trash can body is of a storable can body structure made of an elastic soft material. The anti-odor base is arranged at a portion between the trash can body and the anti-odor cover body. The anti-odor base is of an annular structure as a whole. A lower part of the anti-odor base and the upper part of the trash can body are matched in appearance, an upper part of the anti-odor base and the anti-odor cover body are matched in shape. The rotatable connection rod component configured to connect the anti-odor cover body to the anti-odor base. One end of the rotatable connection rod component is rotatably and movably connected to the anti-odor cover body, and the other end of the rotatable connection rod component is rotatably and movably connected to the anti-odor base, thus the anti-odor cover body is able to rotate relative to the upper part of the trash can body to achieve the opening and closing of the anti-odor cover body relative to the upper part of the trash can body. The container fixing ring arranged at the upper part of the trash can body. A top of the trash can body is provided with a can body sealing part formed on and surrounding a periphery of the trash can body. The container fixing ring is provided with a fixing ring sealing part arranged around a periphery of the container fixing ring in an integrally molded manner. The fixing ring sealing part is configured to be abutted with the can body sealing part in a matched manner to achieve a hermetical connection effect is arranged around a periphery of the container fixing ring in an integrally molded manner. The sling component is connected to an outer side of the trash can body and configured to fix the trash can body to an external object.

Preferably, the high-practicability car trash can further includes a rotating shaft limiting ring arranged on an inner side of the upper part of the trash can body. The inner side of the upper part of the trash can body is provided with a limiting ring slot body. The limiting ring slot is matched with the rotating shaft limiting ring in shape, and configured to embed the rotating shaft limiting ring is formed in the inner side of the upper part of the trash can body; the limiting ring slot body is matched with the rotating shaft limiting ring in shape. The rotating shaft limiting ring is located at a portion between the upper part of the trash can body and the container fixing ring.

Preferably, two sides of the upper part of the trash can body are respectively provided with through holes. Two sides of the rotating shaft limiting ring are respectively provided with rotating shaft rods penetrating through the through holes. The sling component includes a first sling movably connected to the rotating shaft rods.

Preferably, the upper part of the trash can body is provided with a can body limiting part that is configured to mount the rotating shaft limiting ring and the container fixing ring. An outer diameter of the can body limiting part is greater than an outer diameter size of a lower part of the trash can body to form the limiting ring slot body.

Preferably, a periphery of the upper part of the trash can body protrudes outwards to form the can body sealing part; the fixing ring sealing part is of a barb type structure. When the container fixing ring is connected to the trash can body, the fixing ring sealing part is buckled on an outer side of the can body sealing part to achieve hermetical connection. An outer edge of the lower part of the anti-odor base overlays an upper side of the fixing ring sealing part.

Preferably, the anti-odor cover body is provided with a cover body connection part arranged on a back surface of the anti-odor cover body in an integrally molded manner. The cover body connection part is movably connected to one end of the rotatable connection rod component. The rotatable connection rod component includes a rotatable connection rod that is provided with a first end and a second end. The first end is rotatably connected to the cover body connection part. An inner side of the anti-odor base is provided, in an integrally molded manner, with a base supporting rod. The second end of the rotatable connection rod relative to the cover body connection part is movably connected to the base supporting rod to achieve spinning. The high-practicability car trash can further includes a tension spring configured to maintain an elastic recovery property of the rotatable connection rod. One end of the tension spring is connected to the second end of the rotatable connection rod, and the other end of the tension spring is connected to the base supporting rod.

Preferably, the base supporting rod extends downwards and is provided with a supporting rod extension part. The rotatable connection rod is provided with a connection rod rotating shaft at the position corresponding to the supporting rod extension part. The connection rod rotating shaft is movably connected to the supporting rod extension part. The rotatable connection rod is provided, at the second end, with a tension spring connection part that is rotatably and movably connected to the tension spring.

Preferably, the cover body connection part includes a first cover body connection side plate and a second cover body connection side plate which are opposite to each other. The first cover body connection side plate and the second cover body connection side plate are respectively provided with arc-shaped slot bodies or circular through holes. The rotatable connection rod is provided with a cover body connection rotating shaft at the first end. The cover body connection rotating shaft is connected to the arc-shaped slot bodies or the circular through holes in a matched manner. The cover body connection part is located at a portion, close to an edge, on an outer side of the anti-odor cover body. There are two rotatable connection rods and two cover body connection parts, which are symmetrically arranged on the left and right.

Preferably, the sling component includes a first sling connected to the rotating shaft rods and a second sling connected to the lower part of the trash can body. The lower part of the trash can body is provided with a can body sling connection part that is connected to the second sling in a matched manner. An end portion of the second sling is provided with a hook configured to hook an object at a lower part of a seat.

Preferably, an upper part of the anti-odor cover body is further provided with a lifting lug to open the anti-odor cover body.

Technical Effects Achieved by Solving the Technical Problems by the Present Disclosure are as Follows Compared with the prior art, the present disclosure provides a high-practicability car trash can that is simultaneously provided with a trash can body and an anti-odor cover body connected to an upper part of the trash can body in a matched manner; the trash can body is of a storable can body structure made of an elastic soft material; the high-practicability car trash can further includes an anti-odor base arranged at a portion between the trash can body and the anti-odor cover body; a lower part of the anti-odor base and the upper part of the trash can body are matched in appearance; an upper part of the anti-odor base and the anti-odor cover body are matched in shape; the high-practicability car trash can further includes a rotatable connection rod component configured to connect the anti-odor cover body to the anti-odor base; and one end of the rotatable connection rod component is rotatably and movably connected to the anti-odor cover body, and the other end is rotatably and movably connected to the anti-odor base, thus opening and closing the anti-odor cover body. The high-practicability car trash can further includes a container fixing ring arranged at the upper part of the trash can body; a can body sealing part is arranged at a top of the trash can body in a surrounding manner; a fixing ring sealing part that is abutted with the can body sealing part in a matched manner and achieves a hermetical connection effect is arranged around a periphery of the container fixing ring in an integrally molded manner; and the high-practicability car trash can further includes a sling component connected to an outer side of the trash can body and configured to fix the trash can body to an external object. In a practical application process, hermetical connection between the can body sealing part and a fixing ring sealing part can be better used to achieve high sealing performance of the trash can, so as to prevent the influence of odor diffusion on the use experience.

1: car trash can; 11: trash can body; 111: can body sling connection part; 112: can body limiting part; 113: limiting ring slot body; 114: through hole; 115: can body sealing part; 12: second sling; 13: anti-odor cover body; 131: cover body connecting part; 1311: first cover body connection side plate; 1312: second cover body connection side plate; 1313: arc-shaped slot body or circular through hole; 15: anti-odor base; 151: base supporting rod; 152: supporting rod extension part; 16: rotatable connection rod component; 161: rotatable connection rod; 1611: first end; 1612: second end; 162: cover body connection rotating shaft; 163: connection rod rotating shaft; 164: tension spring connection part; 165: tension spring; 17: container fixing ring; 171: fixing ring sealing part; 18: rotating shaft limiting ring; 181: first sling; and 182: rotating shaft rod; 191: hook; 192: lifting lug; 20: sling component.

DETAILED DESCRIPTION OF THE EMBODIMENTS

In order to make the objectives, technical solutions, and advantages of the present disclosure clearer, the following is a further detailed explanation of the present disclosure in conjunction with the accompanying drawings and embodiments. It should be understood that the specific embodiments described here are only intended to explain the present disclosure and are not intended to limit this invention.

Referring to FIG. 1 to FIG. 7, the present disclosure discloses a high-practicability car trash can 1, including a trash can body 11 and an anti-odor cover body 13 connected to an upper part of the trash can body 11 in a matched manner.

Figure 1:
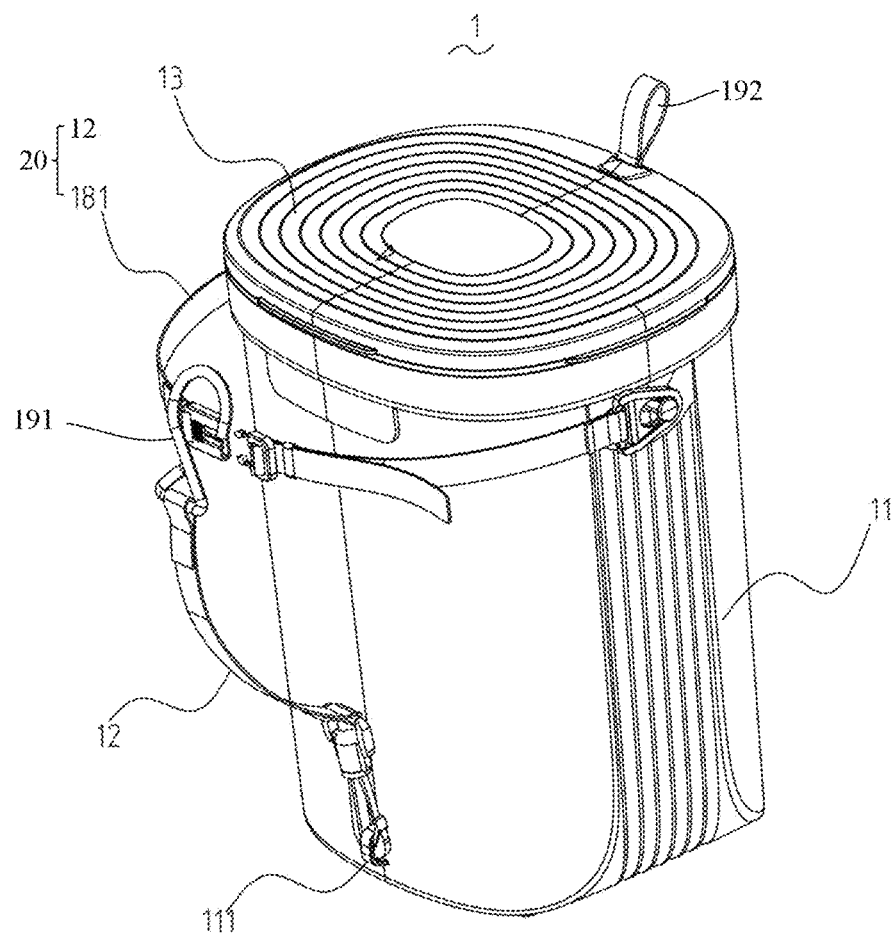
FIG. 1 is a schematic structural diagram of a three-dimensional state of a high-practicability car trash can according to the present disclosure.
Figure 6:
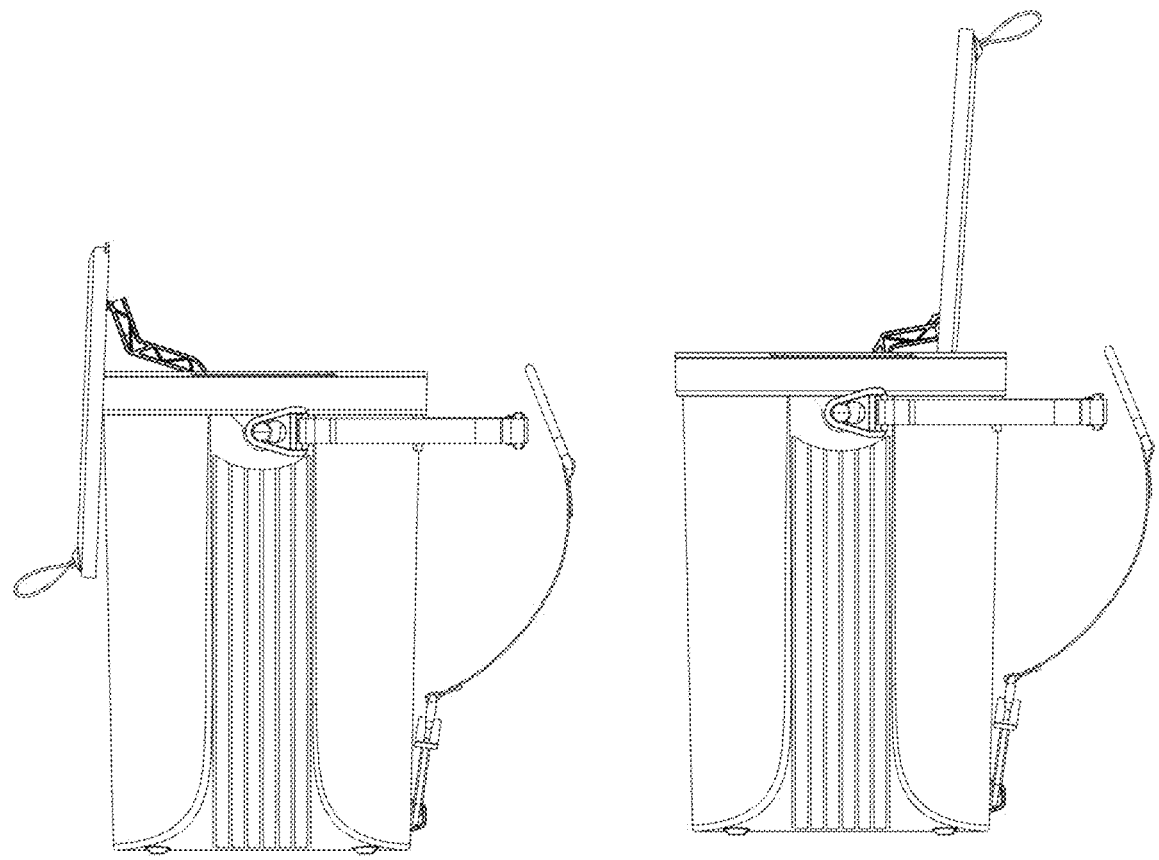
FIG. 6 is a schematic structural diagram of two open states of a high-practicability car trash can according to the present disclosure.
Figure 7:
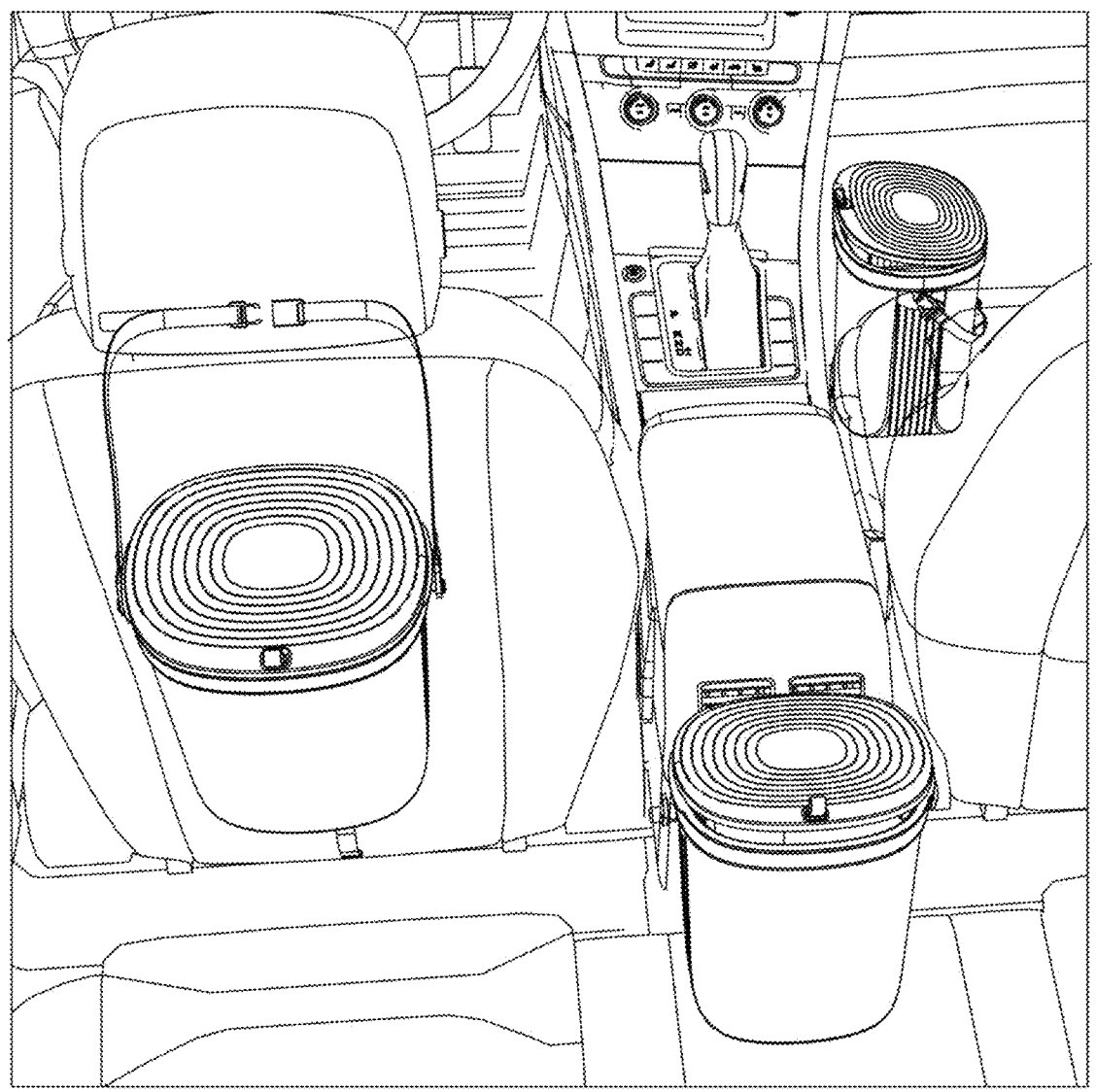
FIG. 7 is a schematic structural diagram of a car application state of a high-practicability car trash can according to the present disclosure.

The anti-odor cover body 13 can rotate relative to the upper part of the trash can body 11, so as to be parallel to an upper end of the trash can body 11 to cover the upper end of the trash can body 11 (as shown in FIGS. 1 and 7), or be folded forwards or backwards relative to the upper part of the trash can body 11 into an open state that forms an L-shaped structure with the upper end of the trash can body 11 (as shown in FIG. 6).

The trash can body 11 is of a storable can body structure made of an elastic soft material. In a non-use state, the trash can body 11 is compressed to be stored, which saves a storage space.

In an actual design, the hardness of the upper part of the trash can body 11 can be greater than the hardness of a can main body itself, achieving a better storage action.

The above-mentioned elastic soft material can be silica gel or a thermoplastic elastomer material. A main elastic material has Shore hardness of about 40 degrees to about 80 degrees.

The thermoplastic material can be a workpiece made of a thermoplastic material such as PE, PP, nylon, and ABS, and is stably combined through fusion. In order to achieve a better usage effect, the trash can body 11 in the practical application can also be a composite material.

Figure 2:
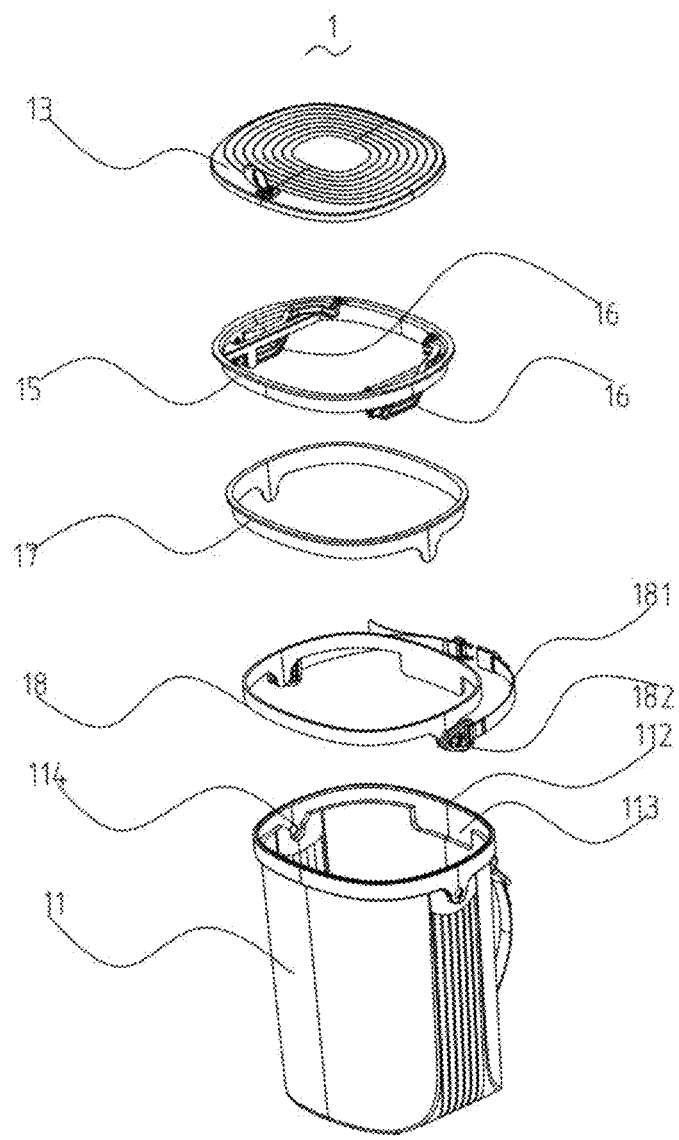
FIG. 2 is a schematic structural diagram of an exploded state of a high-practicability car trash can according to the present disclosure.

Referring to FIG. 2, the high-practicability car trash can 1 further includes an anti-odor base 15 arranged between the trash can body 11 and the anti-odor cover body 13. A lower part of the anti-odor base 15 and the upper part of the trash can body 11 are matched in appearance. An upper part of the anti-odor base 15 and the anti-odor cover body 13 are matched in shape.

The entire anti-odor base 15 is of an annular structure, which corresponds to the structure of the upper part of the trash can body 11.

The high-practicability car trash can 1 further includes a rotatable connection rod component 16 configured to connect the anti-odor cover body 13 to the anti-odor base 15. One end of the rotatable connection rod component 16 is rotatably and movably connected to the anti-odor cover body 13, and the other end of the rotatable connection rod component 16 is rotatably and movably connected to the anti-odor base 15, thus, the anti-odor cover body 13 can rotate relative to the upper part of the trash can body 11 to achieve the opening and closing of the anti-odor cover body 13 relative to the upper part of the trash can body 11.

Figure 3:
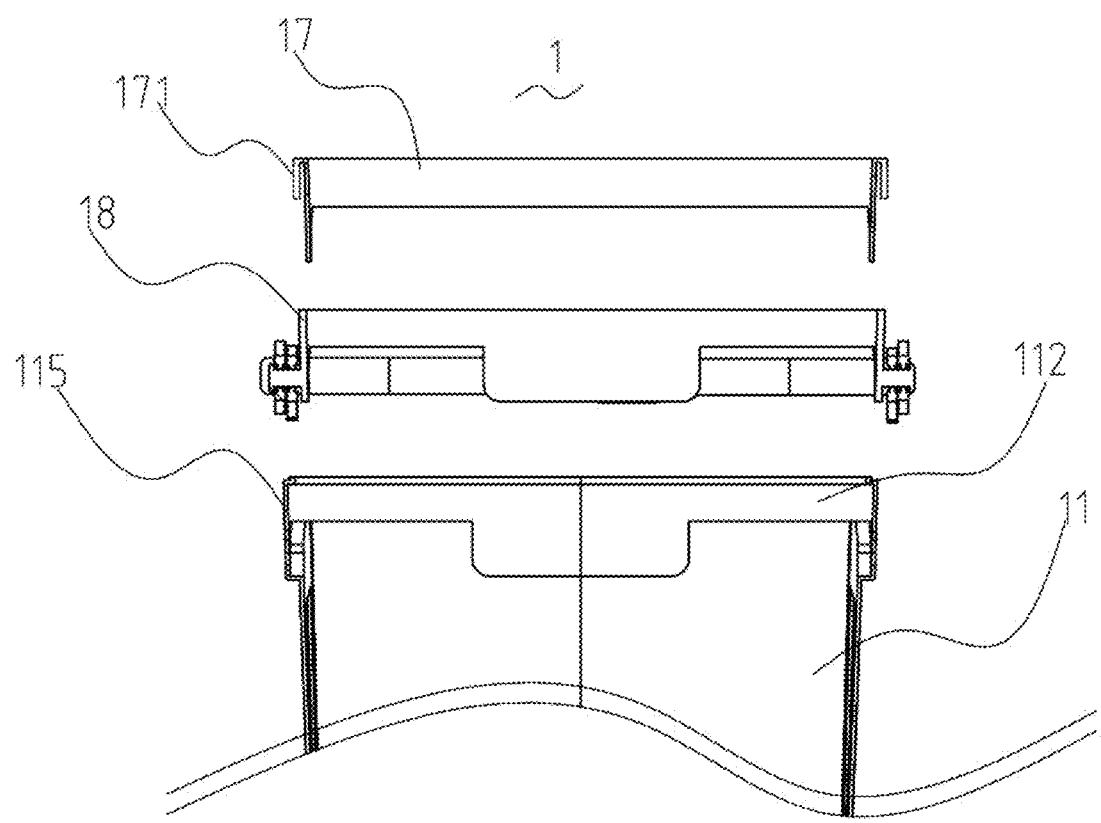
FIG. 3 is a schematic structural diagram of a cross-sectional state of a high-practicability car trash can according to the present disclosure.

Referring to FIGS. 2 and 3, the high-practicability car trash can 1 further includes a container fixing ring 17 arranged at the upper part of the trash can body 11. A top of the trash can body 11 is provided with a can body sealing part 115 surrounding a periphery of the trash can body 11. The container fixing ring 17 is provided with a fixing ring sealing part 171 arranged around a periphery of the container fixing ring 17 in an integrally molded manner. The fixing ring sealing part 171 is configured to be abutted with the can body sealing part 115 in a matched manner to achieve a hermetical connection effect.

In specific applications, the fixing ring sealing part 171 is mainly of a sealing structure abutted with the container fixing ring 17 in a matched manner, which can be in coverage type sealed contact, or of a snap-in structure, or the like.

The high-practicability car trash can 1 further includes a sling component 20 connected to an outer side of the trash can body 11 and configured to fix the trash can body 11 to an external object.

The present disclosure is simultaneously provided with a trash can body 11 and an anti-odor cover body 13 connected to an upper part of the trash can body 11 in a matched manner; the trash can body 11 is of a storable can body structure made of an elastic soft material; the high-practicability car trash can further includes an anti-odor base 15 arranged at a portion between the trash can body 11 and the anti-odor cover body; a lower part of the anti-odor base 15 and the upper part of the trash can body 11 are matched in appearance; an upper part of the anti-odor base 15 and the anti-odor cover body 13 are matched in shape; the high-practicability car trash can further includes a rotatable connection rod component 16 configured to connect the anti-odor cover body 13 to the anti-odor base 15; and one end of the rotatable connection rod component 16 is rotatably and movably connected to the anti-odor cover body 13, and the other end is rotatably and movably connected to the anti-odor base 15, thus the anti-odor cover body 13 is able to rotate relative to the upper part of the trash can body 11 to achieve the opening and closing of the anti-odor cover body 13 relative to the upper part of the trash can body. The high-practicability car trash can further includes a container fixing ring 17 arranged at the upper part of the trash can body 11; a can body sealing part 115 is arranged at a top of the trash can body 11 in a surrounding manner; a fixing ring sealing part 171 that is abutted with the can body sealing part 115 in a matched manner and achieves a hermetical connection effect is arranged around a periphery of the container fixing ring 17 in an integrally molded manner. The high-practicability car trash can further includes a sling component 20 connected to an outer side of the trash can body 11 and configured to fix the trash can body 11 to an external object. In a practical application process, hermetical connection between the can body sealing part 115 and a fixing ring sealing part 171 can be better used to achieve high sealing performance of the trash can, so as to prevent the influence of odor diffusion on the use experience.

In a specific application process, the anti-leakage and anti-odor structure of the car trash can of the present disclosure has a function of preventing water leakage and odor, which can achieve good water leakage and odor prevention effect, so as to significantly improve the problems that the traditional car trash can is not waterproof, is not anti-odor, and is not easy to clean.

In some other embodiments, a rotating shaft limiting ring 18 is further arranged on an inner side of the upper part of the trash can body 11.

A limiting ring slot body 113 configured to embed the rotating shaft limiting ring 18 is formed in the inner side of the upper part of the trash can body 11. The limiting ring slot body 113 is matched with the rotating shaft limiting ring 18 in shape.

The rotating shaft limiting ring 18 is located at a portion between the upper part of the trash can body 11 and the container fixing ring 17.

Through holes 114 are respectively formed in two sides of the upper part of the trash can body 11.

Rotating shaft rods 182 penetrating through the through holes 114 are respectively arranged on two sides of the rotating shaft limiting ring 18.

The sling component 20 includes a first sling 181 that is movably connected to the rotating shaft rods 182, so that an angle of the first sling 181 can be adjusted according to an actual usage condition.

In practical applications, the container fixing ring 17, the rotating shaft limiting ring 18, and the upper part of the trash can body 11 can be made into a hot-molten integrated structure. To achieve a better sealing effect, it is also possible to reduce the quantity of scattered components after actual manufacturing is completed. Hot-molten integrated or dispersed structural constitutions all fall within the protection scope of the present disclosure and are equivalent technical solutions.

A can body limiting part 112 configured to mount the rotating shaft limiting ring 18 and the container fixing ring 17 is arranged at the upper part of the trash can body 11.

An outer diameter of the can body limiting part 112 is greater than an outer diameter size of a lower part of the trash can body 11 to form the limiting ring slot body 113.

A periphery of the upper part of the trash can body 11 protrudes outwards to form the can body sealing part 115, and the fixing ring sealing part 171 is of a barb type structure.

When the container fixing ring 17 is connected to the trash can body 11, the fixing ring sealing part 171 is buckled on or covered, in a matched manner, at an outer side of the can body sealing part 115 to achieve hermetical connection.

An outer edge of the lower part of the anti-odor base 15 overlays an upper side of the fixing ring sealing part 171.

In an actual design, structures similar to the abovementioned sealing structure can also be considered as equivalent technical solutions, such as a sealing slot and a sealing protrusion.

The present disclosure does not specifically limit a length size of the can body sealing part 115.

Figure 4:
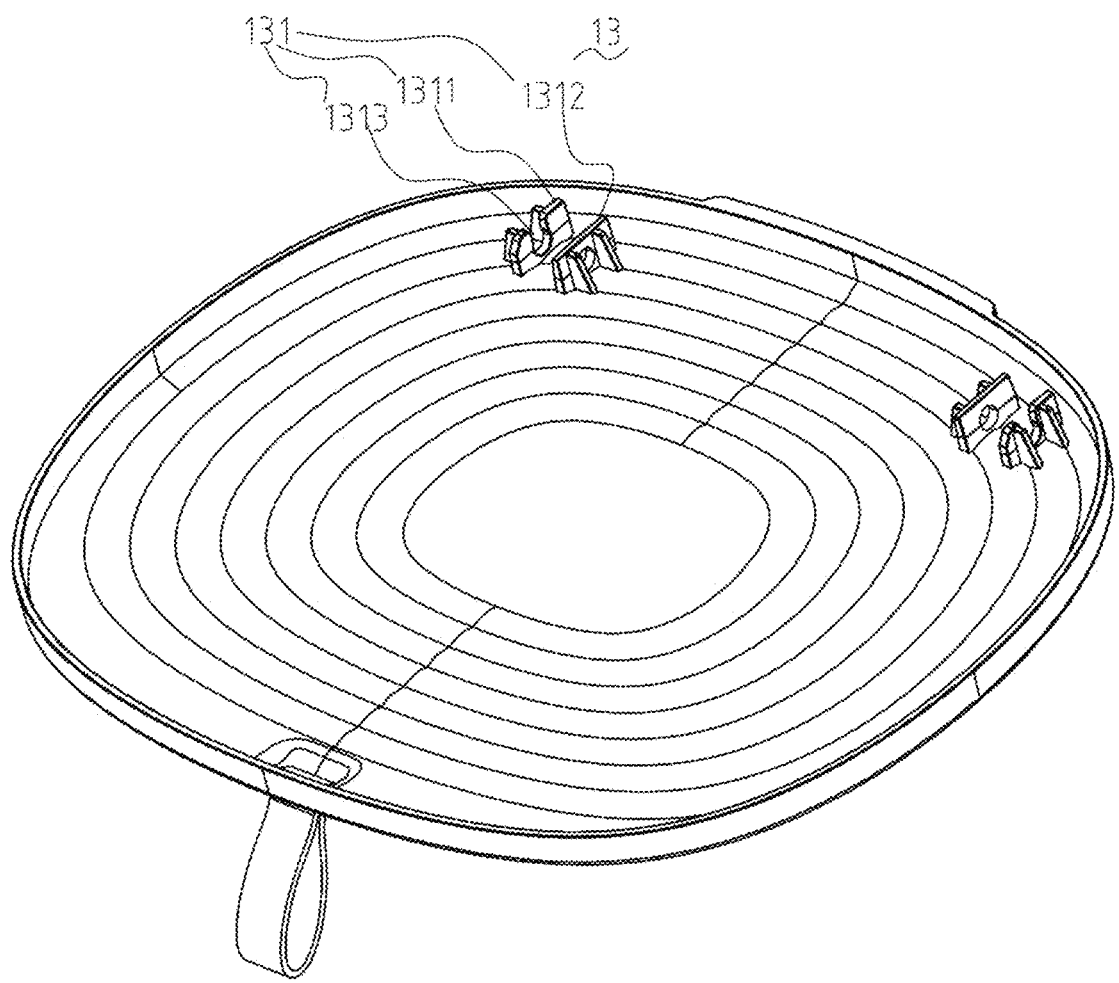
FIG. 4 is a schematic structural diagram of a three-dimensional state of an anti-odor cover body in a high-practicability car trash can according to the present disclosure.
Figure 5:
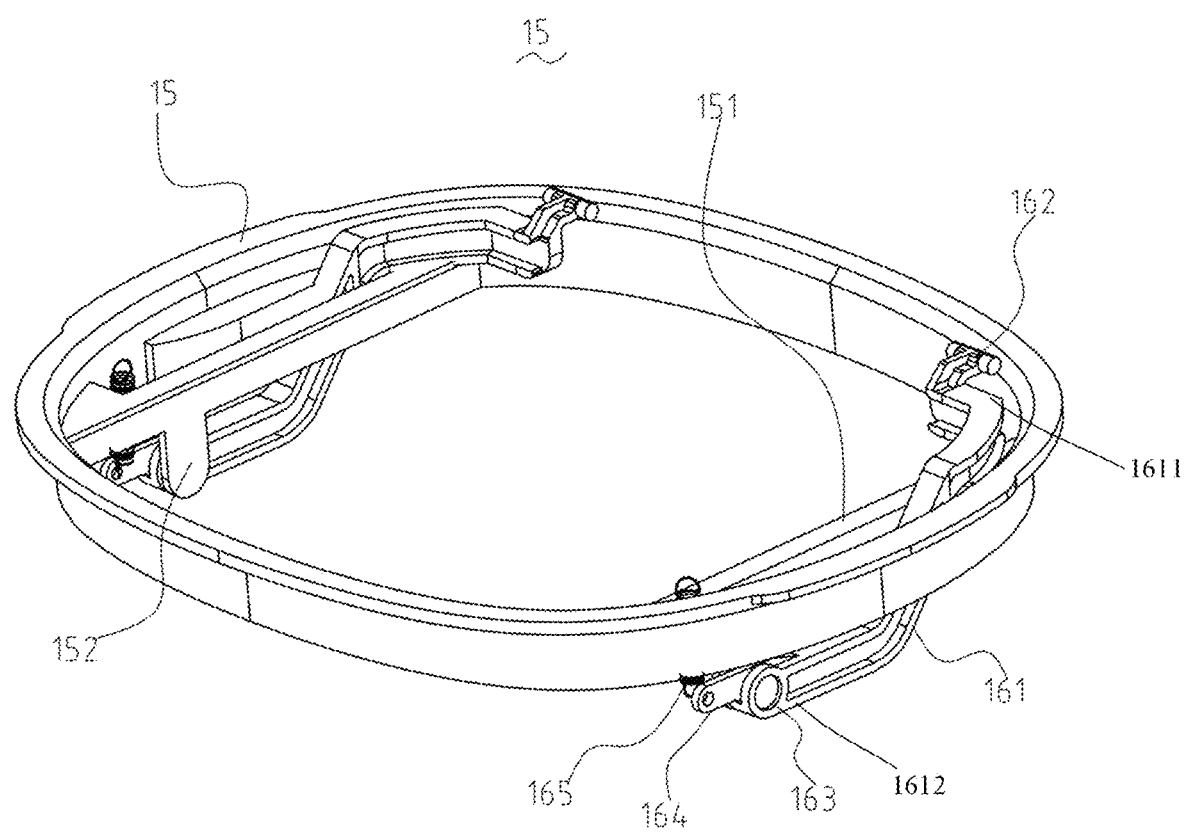
FIG. 5 is a schematic structural diagram of a three-dimensional state of an anti-odor base in a high-practicability car trash can according to the present disclosure.

Referring to FIGS. 4 and 5, a cover body connection part 131 movably connected to one end of the rotatable connection rod component 16 is arranged on a back surface of the anti-odor cover body 13 in an integrally molded manner.

The rotatable connection rod component 16 includes a rotatable connection rod 161 provided with a first end 1611 and a second end 1612. The first end 1611 is rotatably connected to the cover body connection part 131.

A base supporting rod 151 is arranged on an inner side of the anti-odor base 15 in an integrally molded manner. The second end 1612 of the rotatable connection rod 161 is movably connected to the base supporting rod 151 to achieve spinning.

The high-practicability car trash can 1 further includes a tension spring 165 configured to maintain an elastic recovery property of the rotatable connection rod 161.

The first end 1611 of the rotatable connection rod 161 is provided with a structure of a cover body connection rotating shaft 162. The rotatable connection rod 161 is connected to the cover body connection part 131 through the cover body connection rotating shaft 162.

One end of the tension spring 165 is connected to the second end 1611 of the rotatable connection rod 161, and the other end of the tension spring 165 is connected to the base supporting rod 151.

The base supporting rod 151 extends downwards and is provided with a supporting rod extension part 152.

The rotatable connection rod 161 is provided with a connection rod rotating shaft 163 at the position corresponding to the supporting rod extension part 152. The connection rod rotating shaft 163 is movably connected to the supporting rod extension part 152.

The rotatable connection rod 161 is provided, at the second end 1612, with a tension spring connection part 164 that is rotatably and movably connected to the tension spring 165.

The cover body connection part 131 includes a first cover body connection side plate 1311 and a second cover body connection side plate 1312 which are opposite to each other. The first cover body connection side plate 1311 and the second cover body connection side plate 1312 are respectively provided with arc-shaped slot bodies or circular through holes 1313.

Or, one of the first cover body connection side plate 1311 and the second cover body connection side plate 1312 is provided with an arc-shaped slot body, and the other one of the first cover body connection side plate 1311 and the second cover body connection side plate 1312 is provided with a circular through hole structure, which facilitates removal and separation of the rotatable connection rod 161 and the cover body connection part 131.

The rotatable connection rod 161 is provided with the cover body connection rotating shaft 162 at the first end 1611. The cover body connection rotating shaft 162 is connected to the arc-shaped slot bodies or the circular through holes 1313 in a matched manner. The cover body connection part 131 is located at a portion, close to an edge, on an outer side of the anti-odor cover body 13.

There are two rotatable connection rods 161 and two cover body connection parts 131, which are symmetrically arranged on the left and right.

Referring to FIG. 1 again, the sling component 20 further includes a second sling 12 connected to the lower part of the trash can body 11.

A can body sling connection part 111 connected to the second sling 12 in a matched manner is arranged on the lower part of the trash can body 11.

An end portion of the second sling 12 is connected to a hook 19 configured to hook an object at a lower part of a seat.

An upper part of the anti-odor cover body 13 is further provided with a lifting lug 192 to manually open the anti-odor cover body 13.

Technical effects achieved by solving the technical problems by the present disclosure are as follows.

Compared with the prior art, the present disclosure provides a high-practicability car trash can that is simultaneously provided with a trash can body 11 and an anti-odor cover body 13 connected to an upper part of the trash can body 11 in a matched manner; the trash can body 11 is of a storable can body structure made of an elastic soft material; the high-practicability car trash can further includes an anti-odor base 15 arranged at a portion between the trash can body 11 and the anti-odor cover body 13; a lower part of the anti-odor base 15 and the upper part of the trash can body 11 are matched in appearance; an upper part of the anti-odor base 15 and the anti-odor cover body 13 are matched in shape; the high-practicability car trash can further includes a rotatable connection rod component 16 configured to connect the anti-odor cover body 13 to the anti-odor base 15; and one end of the rotatable connection rod component 16 is rotatably and movably connected to the anti-odor cover body 13, and the other end is rotatably and movably connected to the anti-odor base 15, thus opening and closing the anti-odor cover body 13. The high-practicability car trash can further includes a container fixing ring 17 arranged at the upper part of the trash can body 11; a can body sealing part 115 is arranged at a top of the trash can body 11 in a surrounding manner; a fixing ring sealing part 171 that is abutted with the can body sealing part 115 in a matched manner and achieves a hermetical connection effect is arranged around a periphery of the container fixing ring 17 in an integrally molded manner; and the high-practicability car trash can 1 further includes a sling component 20 connected to an outer side of the trash can body 11 and configured to fix the trash can body 11 to an external object. In a practical application process, hermetical connection between the can body sealing part 115 and a fixing ring sealing part 171 can be better used to achieve high sealing performance of the trash can, so as to prevent the influence of odor diffusion on the use experience.

The above implementations of the present disclosure do not constitute a limitation on the protection scope of the present disclosure. Any modification, equivalent replacement, and improvement made within the spirit and principle of the present disclosure shall fall within the protection scope of the claims of the present disclosure.

What is claimed is:

1. A high-practicability car trash can, comprising:
    a trash can body, wherein the trash can body is of a storable can body structure made of an elastic soft material;
    an anti-odor cover body connected to an upper part of the trash can body in a matched manner;
    an anti-odor base arranged between the trash can body and the anti-odor cover body; wherein the anti-odor base is of an annular structure as a whole; a lower part of the anti-odor base and the upper part of the trash can body are matched in appearance; an upper part of the anti-odor base and the anti-odor cover body are matched in shape;
    a rotatable connection rod component configured to connect the anti-odor cover body to the anti-odor base; wherein one end of the rotatable connection rod component is rotatably and movably connected to the anti-odor cover body, and the other end of the rotatable connection rod component is rotatably and movably connected to the anti-odor base, thus the anti-odor cover body is able to rotate relative to the upper part of the trash can body to achieve the opening and closing of the anti-odor cover body relative to the upper part of the trash can body;
    a container fixing ring arranged at the upper part of the trash can body; wherein a top of the trash can body is provided with a can body sealing part formed on and surrounding a periphery of the trash can body; the container fixing ring is provided with a fixing ring sealing part arranged around a periphery of the container fixing ring in an integrally molded manner; wherein the fixing ring sealing part is configured to be abutted with the can body sealing part in a matched manner to achieve a hermetical connection effect; and
    a sling component connected to an outer side of the trash can body and configured to fix the trash can body to an external object.

2. The high-practicability car trash can according to claim 1, further comprising a rotating shaft limiting ring is further arranged on an inner side of the upper part of the trash can body;
    the inner side of the upper part of the trash can body is provided with a limiting ring slot body, wherein the limiting ring slot is matched with the rotating shaft limiting ring in shape, and configured to embed the rotating shaft limiting ring;
    wherein the rotating shaft limiting ring is located at a portion between the upper part of the trash can body and the container fixing ring.

3. The high-practicability car trash can according to claim 2, wherein two sides of the upper part of the trash can body are respectively provided with through holes;
    two sides of the rotating shaft limiting ring are respectively provided with rotating shaft rods penetrating through the through holes; and
    wherein the sling component comprises a first sling movably connected to the rotating shaft rods.

4. The high-practicability car trash can according to claim 2, wherein the upper part of the trash can body is provided with a can body limiting part that is configured to mount the rotating shaft limiting ring and the container fixing ring; and
    wherein an outer diameter of the can body limiting part is greater than an outer diameter size of a lower part of the trash can body to form the limiting ring slot body.

5. The high-practicability car trash can according to claim 1, wherein a periphery of the upper part of the trash can body protrudes outwards to form the can body sealing part; the fixing ring sealing part is of a barb type structure;
    when the container fixing ring is connected to the trash can body, the fixing ring sealing part is buckled on an outer side of the can body sealing part to achieve hermetical connection; and
    an outer edge of the lower part of the anti-odor base overlays an upper side of the fixing ring sealing part.

6. The high-practicability car trash can according to claim 1, wherein the anti-odor cover body is provided with a cover body connection part arranged on a back surface of the anti-odor cover body in an integrally molded manner; wherein the cover body connection part is movably connected to one end of the rotatable connection rod component;
    the rotatable connection rod component comprises a rotatable connection rod that is provided with a first end and a second end; wherein the first end is rotatably connected to the cover body connection part;

an inner side of the anti-odor base is provided, in an integrally molded manner, with a base supporting rod; the second end of the rotatable connection rod is movably connected to the base supporting rod to achieve spinning;

the high-practicability car trash can further comprises a tension spring configured to maintain an elastic recovery property of the rotatable connection rod; and one end of the tension spring is connected to the second end of the rotatable connection rod, and the other end of the tension spring is connected to the base supporting rod.

7. The high-practicability car trash can according to claim 6, wherein the base supporting rod extends downwards and is provided with a supporting rod extension part;

the rotatable connection rod is provided with a connection rod rotating shaft at the position corresponding to the supporting rod extension part; the connection rod rotating shaft is movably connected to the supporting rod extension part; and the rotatable connection rod is provided, at the second end, with a tension spring connection part that is rotatably and movably connected to the tension spring.

8. The high-practicability car trash can according to claim 6, wherein the cover body connection part comprises a first cover body connection side plate and a second cover body connection side plate which are opposite to each other;

the first cover body connection side plate and the second cover body connection side plate are respectively provided with arc-shaped slot bodies or circular through holes;

the rotatable connection rod is provided with a cover body connection rotating shaft at the first end; the cover body connection rotating shaft is connected to the arc-shaped slot bodies or the circular through holes in a matched manner;

the cover body connection part is located at a portion, close to an edge, on an outer side of the anti-odor cover body; and there are two rotatable connection rods and two cover body connection parts, which are symmetrically arranged on the left and right.

9. The high-practicability car trash can according to claim 3, wherein the sling component comprises a first sling connected to the rotating shaft rods and a second sling connected to a lower part of the trash can body;

the lower part of the trash can body is provided with a can body sling connection part that is connected to the second sling in a matched manner; and an end portion of the second sling is provided with a hook configured to hook an object at a lower part of a seat.

10. The high-practicability car trash can according to claim 1, wherein an upper part of the anti-odor cover body is further provided with a lifting lug to open the anti-odor cover body.

* * * * *